(12) United States Patent
Sawtelle

(10) Patent No.: US 12,585,765 B2
(45) Date of Patent: Mar. 24, 2026

(54) SYSTEM AND METHOD FOR ROBUST NATURAL LANGUAGE CLASSIFICATION UNDER CHARACTER ENCODING

(71) Applicant: Barracuda Networks, Inc., Campbell, CA (US)

(72) Inventor: Christopher L. Sawtelle, Santa Clara, CA (US)

(73) Assignee: Barracuda Networks, Inc., Campbell, CA (US)

( * ) Notice: Subject to any disclaimer, the term of this patent is extended or adjusted under 35 U.S.C. 154(b) by 245 days.

(21) Appl. No.: 18/371,878

(22) Filed: Sep. 22, 2023

(65) Prior Publication Data
US 2024/0202329 A1 Jun. 20, 2024

Related U.S. Application Data

(60) Provisional application No. 63/432,961, filed on Dec. 15, 2022.

(51) Int. Cl.
| | |
|---|---|
| *G06N 20/00* | (2019.01) |
| *G06F 21/55* | (2013.01) |
| *G06F 40/126* | (2020.01) |
| *G06F 40/279* | (2020.01) |

(52) U.S. Cl.
CPC .......... *G06F 21/554* (2013.01); *G06F 40/126* (2020.01); *G06F 40/279* (2020.01); *G06N 20/00* (2019.01); *G06F 2221/034* (2013.01)

(58) Field of Classification Search
CPC .... G06F 21/554; G06F 40/126; G06F 40/279; G06F 2221/034; G06N 20/00
See application file for complete search history.

(56) References Cited

U.S. PATENT DOCUMENTS

| | | | | |
|---|---|---|---|---|
| 10,733,529 | B1 * | 8/2020 | Tran ........................ | H04L 51/04 |
| 10,943,067 | B1 * | 3/2021 | Brown ................. | G06F 40/279 |
| 2021/0397972 | A1 * | 12/2021 | Walters ................ | G06N 3/0985 |

OTHER PUBLICATIONS

Tran et al., "Hunting Brand Domain Forgery: A Scalable Classification for Homograph Attack", 2019 (Year: 2019).*
Tran et al., "Hunting Brand Domain Forgery: A Scalable Classification for Homograph Attack", 2019 (Year: 2019) (Year: 2019).*

* cited by examiner

*Primary Examiner* — Richemond Dorvil
*Assistant Examiner* — Adam Michael Weaver

(57) ABSTRACT

A new approach is proposed to support robust natural language classification under character encoding. A plurality of images that represent a plurality of characters under various language encoding schemes for a target language character are accepted and utilized to create a distribution of text similarity probabilities for the plurality of characters likely to be swapped/replaced/substituted with the target language character to trick a human user. The distribution of text similarity probabilities is then applied against a true text corpus comprising a set of real/actual texts to generate a synthetic text corpus that further includes a set of characters being swapped with one or more of the plurality of characters based on the distribution of text similarity probabilities. The synthetic text corpus is then utilized to train one or more NLP models, which are then utilized to correctly classify and recognize an incoming electronic message that contains a character swap attack.

17 Claims, 2 Drawing Sheets

100

100

Images with character encodings

Similarity Probability Engine 102

Probability distribution

Real text corpus

Synthetic Character Encoding Engine 104

Synthetic text corpus

Text-based electronic messages

Electronic Message Classification Engine 106

Attacks identified

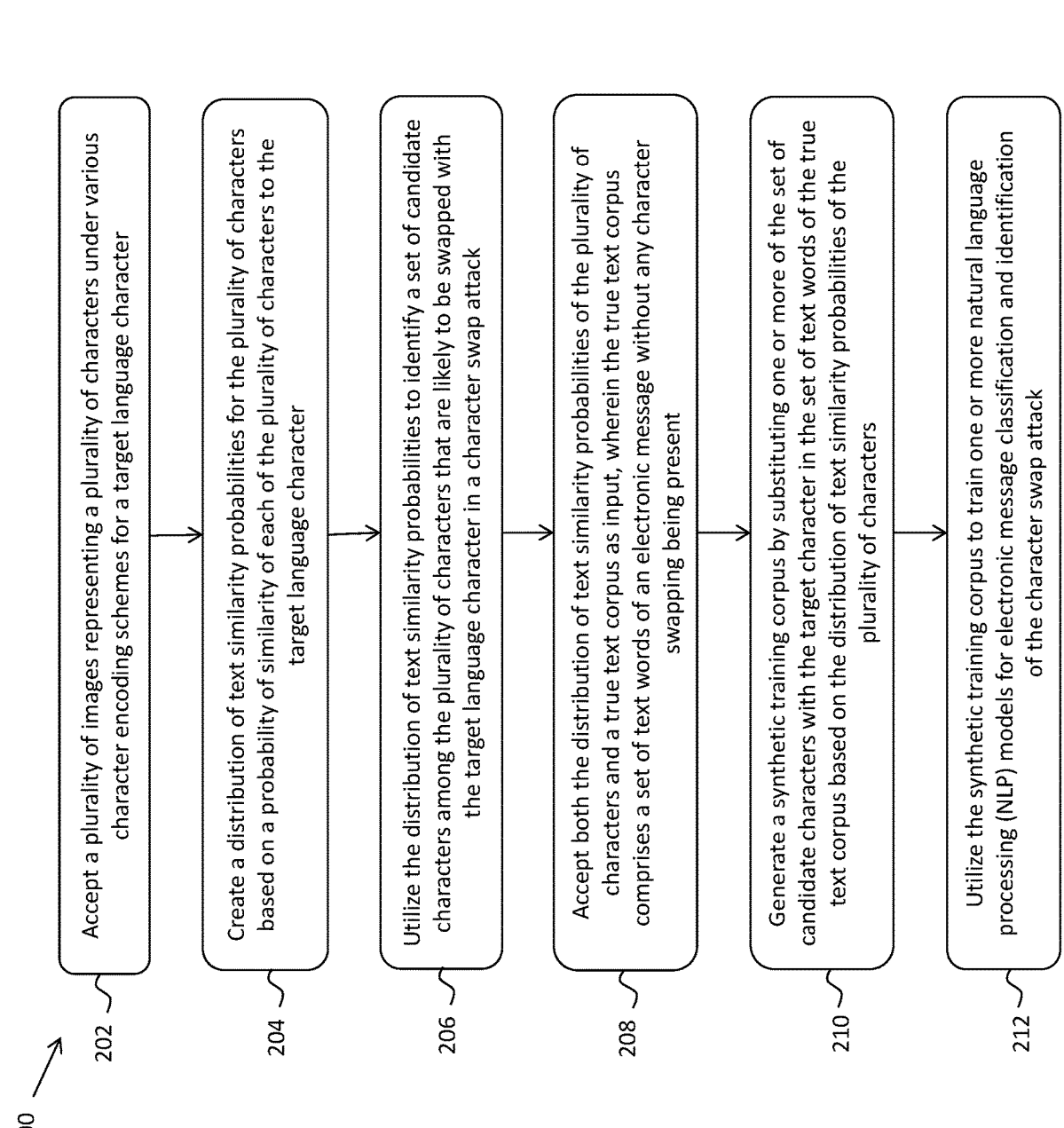

200

202 — Accept a plurality of images representing a plurality of characters under various character encoding schemes for a target language character 204 — Create a distribution of text similarity probabilities for the plurality of characters based on a probability of similarity of each of the plurality of characters to the target language character 206 — Utilize the distribution of text similarity probabilities to identify a set of candidate characters among the plurality of characters that are likely to be swapped with the target language character in a character swap attack 208 — Accept both the distribution of text similarity probabilities of the plurality of characters and a true text corpus as input, wherein the true text corpus comprises a set of text words of an electronic message without any character swapping being present 210 — Generate a synthetic training corpus by substituting one or more of the set of candidate characters with the target character in the set of text words of the true text corpus based on the distribution of text similarity probabilities of the plurality of characters 212 — Utilize the synthetic training corpus to train one or more natural language processing (NLP) models for electronic message classification and identification of the character swap attack

FIG. 2

SYSTEM AND METHOD FOR ROBUST NATURAL LANGUAGE CLASSIFICATION UNDER CHARACTER ENCODING

CROSS-REFERENCE TO RELATED APPLICATIONS

This application claims the benefit of U.S. Provisional Patent Application No. 63/432,961, filed Dec. 15, 2022, which is incorporated herein in its entirety by reference.

BACKGROUND

Natural language processing (NLP), which utilizes artificial intelligence (AI), provides the ability to understand text and spoken words in much the same way human beings can. Natural language classification (also known as text detection, text classification, text tagging or text categorization) is a process of automatically analyzing and categorizing the text into a plurality of organized groups by assigning a set of pre-defined tags or categories to the text based on its content using NLP. A cyberattack (or an attack) may be broadly defined as any attack that involves an electronic device and a network (including particularly the Internet) by an attacker against a target user or device. Many cyberattacks are embedded in and/or initiated from text-based electronic messages, wherein the attacks are carried out via malicious electronic messages. Here, the text-based electronic messages include but are not limited to text messages, instant messages, online chats on a social media platform, voice messages or mails that are automatically converted to be in an electronic text format, or other forms of electronic communications. These malicious electronic messages may evade security check points (e.g., firewalls at gateways) of an internal network of an entity/organization and land in a user's account at the entity. The electronic communication system at the entity need to respond quickly and accurately to the attacks in order to prevent increase in damage and to limit the spread of the attacks via forensics (after the fact) analysis and incident responses.

Currently, methods used to detect the attacks embedded in and/or initiated from the text-based electronic messages often rely on dictionaries of words in various languages with encoded meanings. These dictionary-based text detection methods, however, are unreliable against character swap attacks where one or more target characters in a word of an electronic message can be, under character encoding, written or swapped with different/alternative characters that are visually equivalent to the target characters to humans. For a non-limiting example, the word PACT can be written completely with Cyrillic characters and be visually indistinguishable to a human user. Such character swap attack disrupts the ability of those dictionary-based approaches to classify the text-based electronic messages, which may remain /unaltered from a human user's perspective.

The foregoing examples of the related art and limitations related therewith are intended to be illustrative and not exclusive. Other limitations of the related art will become apparent upon a reading of the specification and a study of the drawings.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 2 depicts a flowchart of an example of a process to support natural language classification under character encoding in accordance with some embodiments.

DETAILED DESCRIPTION OF EMBODIMENTS

Figure 1:
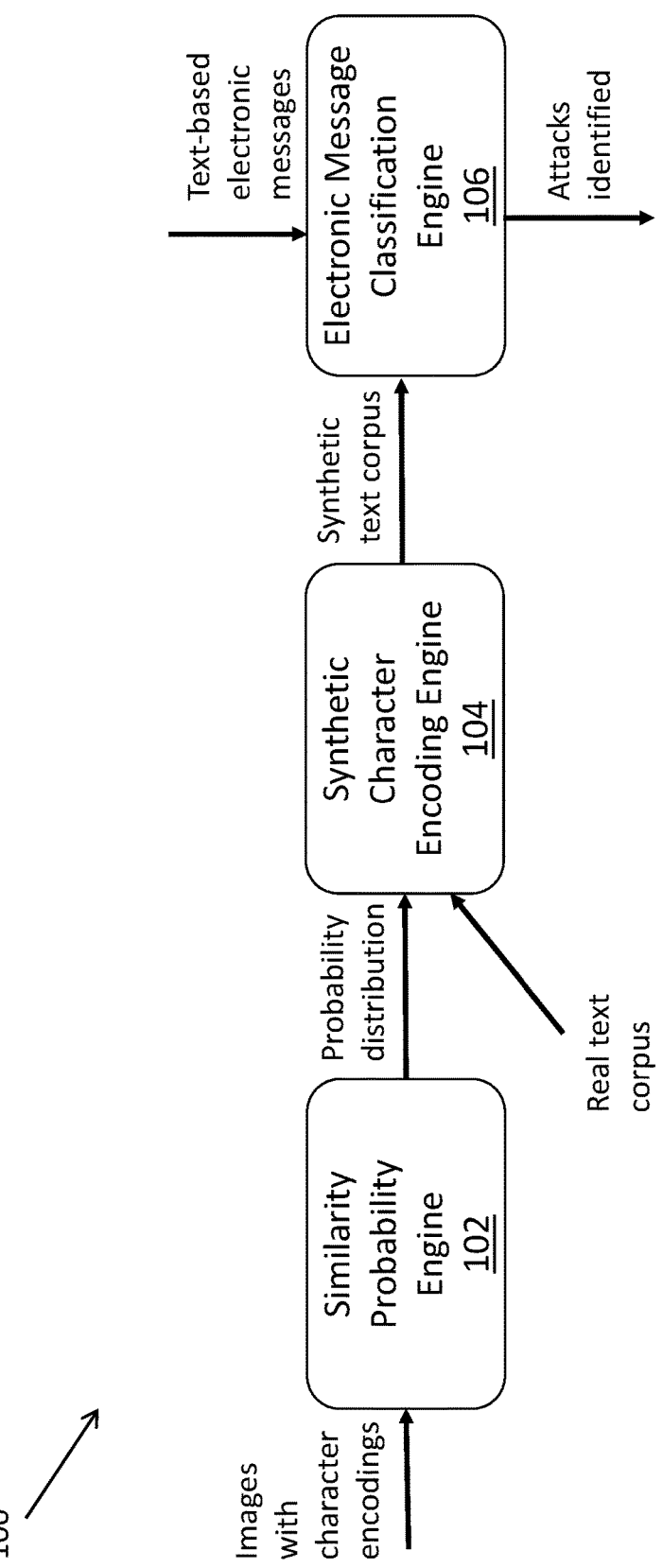
FIG. 1 depicts an example of a system diagram to support natural language classification under character encoding in accordance with some embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

A new approach is proposed that contemplates systems and methods to support robust natural language classification under character encoding. A plurality of images that represent a plurality of characters under various language encoding schemes for a target language character are accepted and utilized to create a distribution of text similarity probabilities for the plurality of characters likely to be swapped/replaced/substituted with the target language character to trick a human user while bypassing a natural language-based text detection mechanism. The distribution of text similarity probabilities of the plurality of characters is then applied against a true text corpus comprising a set of real/actual texts to generate a synthetic text corpus that further includes a set of characters being swapped with one or more of the plurality of characters based on the distribution of text similarity probabilities. The synthetic text corpus is then utilized to train one or more NLP models, which are then utilized to correctly classify and recognize an incoming electronic message that contains a character swap attack.

By creating and utilizing the distribution of similarity probabilities of the plurality of characters, the proposed approach is configured to identify and nullify the effect of character swap attacks that swap characters visually equivalent to a user in a text-based electronic message. The proposed approach achieves this without requiring any additional special step of pre- or post-processing on the text-based electronic message. The proposed approach is human-centered as it utilizes the plurality images of the characters from the various encodings to classify the text-based electronic message from a human first perspective via the synthetic text corpus. As such, the trained NLP models trained with the synthetic text corpus is robust for natural language classification even in spite of character swap attacks.

FIG. 1 depicts an example of a system diagram 100 to support natural language classification under character encoding. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the system 100 includes at least a similarity probability engine 102, a synthetic character encoding and training engine 104, and a electronic message classification engine 106. These engines in the system 100 each run on one or more computing units/appliances/devices/hosts (not shown) each having one or more processors and software instructions stored in a storage unit such as a non-volatile memory of the computing unit for practicing one or more processes. When the software instructions are executed, at least a subset of the software instructions is loaded into memory (also referred to as primary memory) by one of the computing units, which becomes a special purposed one for practicing the processes. The processes may also be at least partially embodied in the computing units into which computer program code is loaded and/or executed, such that, the host becomes a special purpose computing unit for practicing the processes.

In the example of FIG. 1, each computing unit can be a computing device, a communication device, a storage device, or any computing device capable of running a software component. For non-limiting examples, a computing device can be but is not limited to a server machine, a laptop PC, a desktop PC, a tablet, a Google Android device, an iPhone, an iPad, and a voice-controlled speaker or controller. Each of the similarity probability engine 102, the synthetic character encoding and training engine 104, and the electronic message classification engine 106 is associated with one or more communication networks (not shown), which can be but is not limited to, Internet, intranet, wide area network (WAN), local area network (LAN), wireless network, Bluetooth, WiFi, and mobile communication network for communications among the engines. The physical connections of the communication networks and the communication protocols are well known to those of skilled in the art.

In the example of FIG. 1, the similarity probability engine 102 is configured to accept a plurality of images representing a plurality of characters under various character encoding schemes for a target language character. Here, the plurality of images represent what are visible and seen from a human viewer/user's perspective. The similarity probability engine 102 then determines text similarity for each of the plurality of characters shown by the encoded images by predicting probability that the each of the plurality of characters represents the target language character. In some embodiments, the similarity probability engine 102 is configured to create a distribution of text similarity probabilities for the plurality of characters based on the similarities of each of the plurality of characters to the target language character. The similarity probability engine 102 then utilizes such distribution of text similarity probabilities to identify a set of candidate characters among the plurality of characters that are likely to be swapped/encoded/substituted with the target language character in a phishing or character swap attack to trick a human user while bypassing a natural language-based text detection mechanism. In some embodiments, the similarity probability engine 102 is configured to repeat the process above and to generate a plurality of distributions of text similarity probabilities for a plurality of target language characters. The similarity probability engine 102 then identifies a set of candidates that are likely to be swapped with each of the plurality of target language characters in a character swap attack.

As a nonlimiting example and for illustration purposes a Cyrillic alphabet is used to illustrate the embodiments. A list of Cyrillic alphabets is shown below for convenience.

| | |
|---|---|
| A a (A) | P p (R) |
| B b (B) | C c (S) |
| В $_B$ (V) | T $_T$ (T) |
| Г г (G) | Y y (U) |
| П п (D) | Ф ф (F) |
| E e (E) | X x (KH) |
| Ё ё (YO) | Ц ц (TS) |
| Ж ж (ZH) | Ч ч (CH) |
| З з (Z) | Ш ш (SH) |
| И и (I) | Щ щ (SHCH) |
| Й й (Y) | Ъ (—) |
| К $_K$ (K) | Ы (Y) |
| Л л (L) | Ь (') |
| M $_M$ (M) | Э э (E) |
| H $_H$ (N) | Ю ю (YU or IU) |
| O $_O$ (O) | Я я (YA or IA) |
| П п (P) | |

Certain Cyrillic letters and/or English alphabet letters may be swapped in a cyberattack with high probability that the swap is undetectable with human eyes. For a non-limiting example, Cyrillic "A" may be swapped with English letter "A" or vice versa, and the swap may be hard or impossible to detect with human eyes as shown above. Similarly, Cyrillic "C" may be swapped with English "C" or vice versa, and the swap may also be hard or impossible to detect with human eyes. In contrast, Cyrillic "Ф" swapped with English "O" may be detected easier because there would be no line going through it. As described above, the similarity probability engine 120 is configured to create a distribution of text similarity probabilities for the plurality of characters based on the similarities of each of the plurality of characters to the target language character (e.g., similarities between English letters and Cyrillic).

In the example of FIG. 1, the synthetic character encoding and training engine 104 is configured to accept, as its input, both the distribution of text similarity probabilities of the plurality of characters and a true text corpus/collection, wherein the true text corpus comprises a set of real/actual text words of an electronic message in a phishing and scam attack without any character swapping being present. For illustrative purposes, the distribution of text similarity probabilities of the plurality of characters for Cyrillic and/or English alphabet are received by the synthetic character encoding and training engine 104. The synthetic character encoding and training engine 104 is then configured to generate a synthetic training corpus by substituting one or more of the set of candidate characters with the target character in the set of words of the true text corpus based on the distribution of text similarity probabilities of the plurality of characters. For a non-limiting example, assuming that the word "Account" is received but where the letter "A" is in fact in Cyrillic. Although a person may see the word "Account" via human eyes, the synthetic character encoding and training engine 104 detects the Cyrillic letter "A" and replaces the letter "A" in Cyrillic with a Unicode for Cyrillis, e.g., "/u0410". In other words, the words "Account" is replaced with "/u0410ccount" where "/u0410" indicates that a letter "A" is in Cyrillis while the rest of the characters are in not, i.e., a letter has been swapped. Similarly, other letters may also be substituted based on the probabilities in a cyberattack. For another non-limiting example, in the "Account" example, the first "c" may be replaced with its Cyrillis Unicode forming the word "Account" as "/u0410/ u0441count" while in another non-limiting example the second "c" may also be replaced with its Cyrillis Unicode forming the word "Account" as "/u0410/u0441/u0441ount". The resulting synthetic training corpus extends the true text corpus to further include one or more of the set of candidate characters and can be utilized to represent/simulate a true character swap attack where the character swapping method is actually applied. Accordingly, with the substitution, as described above, a machine learning (ML) algorithm is enabled to locate the swapped characters and their position information to extract the correct meaning and detect an attack.

In the example of FIG. 1, the electronic message classification engine 106 is configured to utilize the synthetic training corpus to train one or more NLP models or algorithms for electronic message classification and identification based on likely probabilities of a character swap attack. After the one or more NLP models have been trained, the electronic message classification engine 106 is configured to classify and identify an actual incoming text-based electronic message that may contain a character swap attack using the trained one or more NLP models. Here, the incoming text-based electronic message can be but is not limited to one of a text message, an instant message, an online chat on a social media platform, a voice messages or mail that have been automatically converted to be in an electronic text format, or other form of electronic communication. Since the synthetic training corpus has been extended to include substituted characters, unlike the models based on dictionary-based text detection, the one or more NLP models trained with the synthetic training corpus can be utilized by the electronic message classification engine 106 to correctly classify and recognize the character swap attack in the incoming electronic message without requiring any additional or special case pre or post processing on the incoming text-based electronic message.

FIG. 2 depicts a flowchart 200 of an example of a process to support natural language classification under character encoding. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where a plurality of images representing a plurality of characters under various character encoding schemes for a target language character are accepted. The flowchart 200 continues to block 204, where a distribution of text similarity probabilities is created for the plurality of characters based on a text similarity of each of the plurality of characters to the target language character. The flowchart 200 continues to block 206, where the distribution of text similarity probabilities is utilized to identify a set of candidate characters among the plurality of characters that are likely to be swapped with the target language character in a character swap attack. The flowchart 200 continues to block 208, where both the distribution of text similarity probabilities of the plurality of characters and a true text corpus are accepted as input, wherein the true text corpus comprises a set of text words of an electronic message without any character swapping being present. The flowchart 200 continues to block 210, where a synthetic training corpus is generated by substituting one or more of the set of candidate characters with the target character in the set of text words of the true text corpus based on the distribution of text similarity probabilities of the plurality of characters. The flowchart 200 ends at block 212, where the synthetic training corpus is utilized to train one or more natural language processing (NLP) models for electronic message classification and identification of the character swap attack.

One embodiment may be implemented using a conventional general purpose or a specialized digital computer or microprocessor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits or by interconnecting an appropriate network of conventional component circuits, as will be readily apparent to those skilled in the art.

The methods and system described herein may be at least partially embodied in the form of computer-implemented processes and apparatus for practicing those processes. The disclosed methods may also be at least partially embodied in the form of tangible, non-transitory machine readable storage media encoded with computer program code. The media may include, for example, RAMs, ROMs, CD-ROMs, DVD-ROMs, BD-ROMs, hard disk drives, flash memories, or any other non-transitory machine-readable storage medium, wherein, when the computer program code is loaded into and executed by a computer, the computer becomes an apparatus for practicing the method. The methods may also be at least partially embodied in the form of a computer into which computer program code is loaded and/or executed, such that, the computer becomes a special purpose computer for practicing the methods. When implemented on a general-purpose processor, the computer program code segments configure the processor to create specific logic circuits. The methods may alternatively be at least partially embodied in a digital signal processor formed of application specific integrated circuits for performing the methods.

What is claimed is:

1. A system, comprising:
a similarity probability engine configured to
  accept a plurality of images representing a plurality of characters under various character encoding schemes for a target language character;
  create a distribution of text similarity probabilities for the plurality of characters based on a text similarity of each of the plurality of characters to the target language character;
  utilize the distribution of text similarity probabilities to identify a set of candidate characters among the plurality of characters that are likely to be swapped with the target language character in a character swap attack;
a synthetic character encoding and training engine configured to
  accept, as its input, both the distribution of text similarity probabilities of the plurality of characters and a true text corpus, wherein the true text corpus comprises a set of text words of an electronic message without any character swapping being present;
  generate a synthetic training corpus by substituting one or more of the set of candidate characters with the target character in the set of text words of the true text corpus based on the distribution of text similarity probabilities of the plurality of characters;

an electronic message classification engine configured to utilize the synthetic training corpus to train one or more natural language processing (NLP) models for electronic message classification and identification of the character swap attack, and wherein the electronic message classification engine is further configured to classify an actual incoming text-based electronic message that contains a character swap attack using the trained one or more NLP models trained with the synthetic training corpus.

2. The system of claim 1, wherein:
the plurality of images represent what are visible from a human user's perspective.

3. The system of claim 1, wherein:
the incoming text-based electronic message is one of a text message, an instant message, an online chat on a social media platform, a voice messages or mail that have been automatically converted to be in an electronic text format, or other form of electronic communication.

4. The system of claim 1, wherein:
the similarity probability engine is configured to determine the text similarity of the distribution of text similarity probabilities for each of the plurality of characters by predicting a probability that the each of the plurality of characters represents the target language character.

5. The system of claim 1, wherein:
the similarity probability engine is configured to generate a plurality of distributions of text similarity probabilities for a plurality of target language characters.

6. The system of claim 5, wherein:
the similarity probability engine is configured to identify a set of candidate characters that are likely to be swapped with each of the plurality of target language characters in the character swap attack.

7. The system of claim 1, wherein:
the synthetic training corpus extends the true text corpus to further include the one or more of the set of candidate characters to represent/simulate the character swap attack.

8. The system of claim 1, wherein:
the electronic message classification engine is configured to recognize the character swap attack in the incoming electronic message without requiring any additional processing on the incoming text-based electronic message.

9. A computer-implemented method, comprising:
accepting a plurality of images representing a plurality of characters under various character encoding schemes for a target language character;
creating a distribution of text similarity probabilities for the plurality of characters based on a text similarity of each of the plurality of characters to the target language character;
utilizing the distribution of text similarity probabilities to identify a set of candidate characters among the plurality of characters that are likely to be swapped with the target language character in a character swap attack;
accepting both the distribution of text similarity probabilities of the plurality of characters and a true text corpus as input, wherein the true text corpus comprises a set of text words of an electronic message without any character swapping being present;
generating a synthetic training corpus by substituting one or more of the set of candidate characters with the target character in the set of text words of the true text corpus based on the distribution of text similarity probabilities of the plurality of characters;
utilizing the synthetic training corpus to train one or more natural language processing (NLP) models for electronic message classification and identification of the character swap attack; and
classifying an actual incoming text-based electronic message that contains the character swap attack using the trained one or more NLP models trained with the synthetic training corpus.

10. The method of claim 9, wherein:
the plurality of images represent what are visible from a human user's perspective.

11. The method of claim 9, wherein:
the incoming text-based electronic message is one of a text message, an instant message, an online chat on a social media platform, a voice messages or mail that have been automatically converted to be in an electronic text format, or other form of electronic communication.

12. The method of claim 9, further comprising:
determining the text similarity of the distribution of text similarity probabilities for each of the plurality of characters by predicting a probability that the each of the plurality of characters represents the target language character.

13. The method of claim 9, further comprising:
generating a plurality of distributions of text similarity probabilities for a plurality of target language characters.

14. The method of claim 13, further comprising:
identifying a set of candidate characters that are likely to be swapped with each of the plurality of target language characters in the character swap attack.

15. The method of claim 9, wherein:
the synthetic training corpus extends the true text corpus to further include the one or more of the set of candidate characters to represent/simulate the character swap attack.

16. The method of claim 9, further comprising:
recognizing the character swap attack in the incoming electronic message without requiring any additional processing on the incoming text-based electronic message.

17. A non-transitory storage medium having software instructions stored thereon that when executed cause a system to:
accept a plurality of images representing a plurality of characters under various character encoding schemes for a target language character;
create a distribution of text similarity probabilities for the plurality of characters based on a probability of similarity of each of the plurality of characters to the target language character;
utilize the distribution of text similarity probabilities to identify a set of candidate characters among the plurality of characters that are likely to be swapped with the target language character in a character swap attack;
accept both the distribution of text similarity probabilities of the plurality of characters and a true text corpus as input, wherein the true text corpus comprises a set of text words of an electronic message without any character swapping being present;
generate a synthetic training corpus by substituting one or more of the set of candidate characters with the target character in the set of text words of the true text corpus based on the distribution of text similarity probabilities of the plurality of characters;

utilize the synthetic training corpus to train one or more natural language processing (NLP) models for electronic message classification and identification of the character swap attack; and classify an actual incoming text-based electronic message that contains the character swap attack using the trained one or more NLP models trained with the synthetic training corpus.

* * * * *